United States Patent [19]

Nishimura et al.

[11] 4,320,160

[45] Mar. 16, 1982

[54] FABRIC STRUCTURE FOR FIBER REINFORCED PLASTICS

[75] Inventors: Akira Nishimura, Ohtsu; Kyuichiro Nishimura, Shiga, both of Japan

[73] Assignee: Toray Industries, Inc., Tokyo, Japan

[21] Appl. No.: 192,548

[22] Filed: Sep. 30, 1980

Related U.S. Application Data

[63] Continuation-in-part of Ser. No. 68,422, Aug. 21, 1979, abandoned.

[51] Int. Cl.³ .................. B32B 5/12; D04H 3/04; D03D 15/00
[52] U.S. Cl. .................. 428/107; 139/470 R; 428/109; 428/110; 428/111; 428/114; 428/294; 428/295; 428/902
[58] Field of Search .......... 139/408, 409, 413, 414, 139/420 R; 428/107, 109, 110, 111, 112, 113, 114, 294, 295, 902

[56] References Cited

U.S. PATENT DOCUMENTS

| | | | |
|---|---|---|---|
| 2,804,099 | 8/1957 | Sherman | 139/420 R |
| 2,919,217 | 12/1959 | Bobkowicz | 428/114 |
| 3,249,128 | 5/1966 | Lord | 139/419 |
| 3,434,510 | 3/1969 | Negret | 139/413 |
| 3,775,235 | 11/1973 | Howell | 428/114 |
| 3,819,461 | 6/1974 | Saffadi | 428/107 |
| 3,983,282 | 9/1976 | Seemann | 428/114 |
| 4,071,647 | 1/1978 | McMullen | 428/107 |
| 4,092,453 | 5/1978 | Jonda | 428/902 |

FOREIGN PATENT DOCUMENTS

| | | |
|---|---|---|
| 751392 | 6/1956 | United Kingdom . |
| 808065 | 1/1959 | United Kingdom . |
| 1082684 | 9/1967 | United Kingdom . |

*Primary Examiner*—William R. Dixon, Jr.
*Attorney, Agent, or Firm*—Armstrong, Nikaido, Marmelstein & Kubovcik

[57] ABSTRACT

Disclosed is a fabric structure for fiber reinforced plastics, which comprises at least two yarn groups composed of straight reinforcing filamentary yarns composed of carbon fibers being free of bends and gathered in one direction in the form resembling a sheet, wherein the yarn groups are integrated with each other by auxiliary filamentary yarns so that the sheet-like faces of the yarn groups are made to confront each other and reinforcing filamentary yarns of one yarn group intersect reinforcing filamentary yarns of the other yarn group, and the auxiliary filamentary yarns have a higher elongation at break than that of the reinforcing filamentary yarns.

21 Claims, 9 Drawing Figures

FABRIC STRUCTURE FOR FIBER REINFORCED PLASTICS

This application is a continuation-in-part of Application Ser. No. 68,422, filed Aug. 21, 1979, now abandoned.

BACKGROUND OF THE INVENTION (1) Field of the Invention:

The present invention relates to a fabric structure for fiber reinforced plastics (hereinafter referred to as FRP). More particularly, the invention relates to a fabric structure which is valuable as a reinforcing material for FRP, especially for a resin to be used as a matrix in FRP.

(2) Description of the Prior Art:

FRP formed of a resin reinforced by a fibrous material composed of reinforcing fibers such as carbon fibers or glass fibers is well known. A woven fabric of reinforcing fibers is often used as the fibrous material.

In a fibrous material in the form of a woven fabric, however, since reinforcing fibers are bent at crossing points of warps and wefts, the stress is concentrated on those bent portions and therefore, characteristic properties of reinforcing fibers, such as high tenacity and high elasticity, cannot be sufficiently utilized.

Furthermore, when FRP having a cone-like or dome-like shell structure, such as an acoustic vibratory plate for a loud speaker, is formed by using one sheet of a woven fabric, since the reinforcing fibers come to have a shape resembling a bent corrugated sheet, the flexural stiffness is not sufficiently manifested.

Attempts have heretofore been made to form FRP by using a so-called unidirectional woven fabric composed of warps consisting of straight reinforcing fibers free of bends.

However, in the unidirectional woven fabric, since physical properties in the warp direction differ from those in the weft direction and the woven fabric is anisotropic in physical properties, warps should be arranged so that groups consisting of a plurality of warps are laminated to cross one another, and therefore, the operation of forming FRP becomes complicated and troublesome.

SUMMARY OF THE INVENTION

An object of the present invention is to provide a fabric structure for FRP in which the above-mentioned disadvantages involved in the conventional woven fabrics as reinforcing fibrous materials of composite materials are eliminated, characteristic properties of reinforcing fibers, such as high strength and high modulus, can be manifested substantially completely and which can provide a composite material excellent in specific strength and specific modulus very simply and easily.

In accordance with the present invention, this object can be attained by a fabric structure for FRP, which comprises at least two yarn groups composed of straight reinforcing filamentary yarns being free of bends and gathered in one direction in the form resembling a sheet, wherein the yarn groups are integrated with each other by auxiliary filamentary yarns so that the sheet-like faces of the yarn groups are made to confront each other and reinforcing filamentary yarns of one yarn group intersect reinforcing filamentary yarns of the other yarn group, and the auxiliary filamentary yarns have a higher elongation at break than that of the reinforcing filamentary yarns.

DETAILED DESCRIPTION OF THE PREFERRED EMBODIMENTS

The present invention will now be described in detail by reference to the embodiments illustrated in the accompanying drawings.

Figure 1:
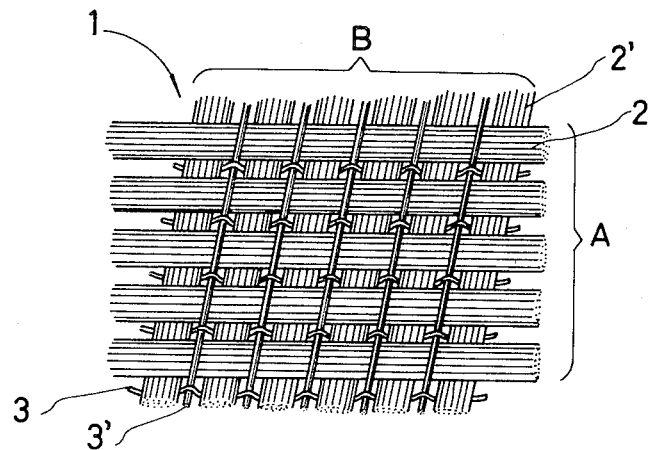
FIG. 1 is an enlarged perspective view illustrating one embodiment of the fabric structure for FRP according to the present invention.

Referring to FIG. 1 which is an enlarged perspective view showing one embodiment of the fabric structure for FRP (hereinafter referred to merely as "structure") according to the present invention, the structure 1 has reinforcing filamentary yarns 2 and 2' and auxiliary filamentary yarns 3 and 3'. In the structure 1, a yarn group A composed of a plurality of straight reinforcing filamentary yarns 2 gathered in one direction (the horizontal direction in FIG. 1) in parallel to one another in the form resembling a sheet is laminated on a yarn group B composed of a plurality of straight reinforcing filamentary yarns 2' gathered in one direction (the vertical direction in FIG. 1) in parallel to one another in the form resembling a sheet. In the embodiment illustrated in FIG. 1, each of the reinforcing filamentary yarns 2 and 2' is a multifilament yarn composed of a plurality of single filaments. By the terms "form resembling a sheet" used herein is meant the state where reinforcing filamentary yarns are arranged on one plane, and by the term "straight" is meant the state in which the yarns are not conspicuously bent weavily as in ordinary fabrics.

In the structure shown in FIG. 1, the face of the sheet composed of the yarn group A is made to confront the face of the sheet composed of the yarn group B. Namely, the sheets are laminated. The reinforcing filamentary yarns 2 and 2' cross one another at a right angle. Of auxiliary filamentary yarns 3 and 3', the auxiliary filamentary yarns 3' parallel to the reinforcing filamentary yarns 2' are located outside the yarn group A, that is, above the yarn group A in the embodiment shown in FIG. 1, and they are arranged straightly among the reinforcing filamentary yarns 2' arranged in parallel to one another. In the embodiment shown in FIG. 1, since also the auxiliary filamentary yarns are straight, they are also laminated on the yarn group A. The other auxiliary filamentary yarns 3 are located among the reinforcing filamentary yarns 2 arranged in parallel to one another, and the auxiliary filamentary yarns 3 are arranged in parallel to the reinforcing filamentary yarns 2 but they are not straight. Namely, the auxiliary filamentary yarns 3 are bent while being entangled with the respective reinforcing filamentary yarns 2' and auxiliary filamentary yarns 3'. The auxiliary filamentary yarns 3 are bent and arranged in the same manner as in ordinary woven fabrics. In the embodiment shown in FIG. 1, each of the auxiliary filamentary yarns 3 and 3' is composed of a multifilament yarn as well as the reinforcing filamentary yarns 2 and 2'.

In the embodiment shown in FIG. 1, each of the reinforcing filamentary yarns 2 and 2' has a flat cross section. More specifically, in each of the reinforcing filamentary yarns, reinforcing filaments (single filaments) are arranged in the flat form so that each reinforcing filamentary yarn has a tape-like shape. Therefore, the entire structure has no large thickness and it has a sheet-like shape.

The structure shown in FIG. 1 may be prepared in the following manner:

Reinforcing filamentary yarns and auxiliary filamentary yarns are wound on different warp beams, and they are passed through different healds so that the reinforcing filamentary yarns and auxiliary filamentary yarns are arranged alternately one by one. Separately, reinforcing filamentary yarns and auxiliary filamentary yarns are beaten alternately one by one from the weft direction by a rapier loom or the like. At this point, the tension on the auxiliary yarn as the warps are made larger than the tension on the auxiliary filamentary yarns as the wefts.

Figure 2:
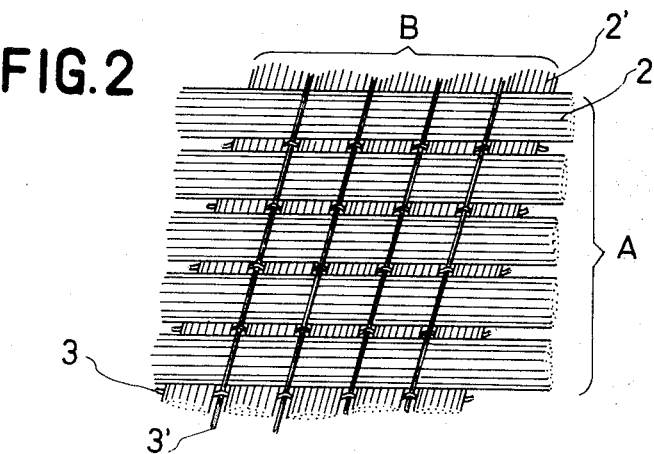
FIG. 2 is an enlarged perspective view illustrating a second embodiment of the fabric structure according to the present invention.

FIG. 2 is a view illustrating another embodiment of the structure of the present invention. The structure shown in FIG. 2 is similar to the structure shown in FIG. 1 but is different from the structure shown in FIG. 1 in the point that the number of reinforcing filaments constituting each of the reinforcing filamentary yarns 2 and 2' is 2 times the number of reinforcing filaments constituting each of the reinforcing filamentary yarns 2 and 2' in the structure shown in FIG. 1.

Accordingly, in the structure shown in FIG. 2, the thickness of the reinforcing filamentary yarns 2 and 2' is approximately the same as that of the structure shown in FIG. 1, but the width of the reinforcing filamentary yarns 2 and 2' is larger than in the structure shown in FIG. 1. In the structure shown in FIG. 2, the quantity of the reinforcing filaments per unit volume is larger than in the structure shown in FIG. 1, and therefore, the strength is increased.

The structure shown in FIG. 2 may be prepared by using reinforcing filamentary yarns comprising a larger number of filaments according to the method described hereinbefore with respect to the structure shown in FIG. 1. Moreover, the structure shown in FIG. 2 may be prepared by using the same reinforcing filamentary yarns as used for formation of the structure shown in FIG. 1, passing the reinforcing filamentary yarns and auxiliary filamentary yarns through different healds so that two reinforcing filamentary yarns alternate with one auxiliary filamentary yarn, and beating reinforcing filamentary yarns and auxiliary filamentary yarns from the weft direction so that two reinforcing filamentary yarns alternate with one auxiliary filamentary yarn.

Figure 3:
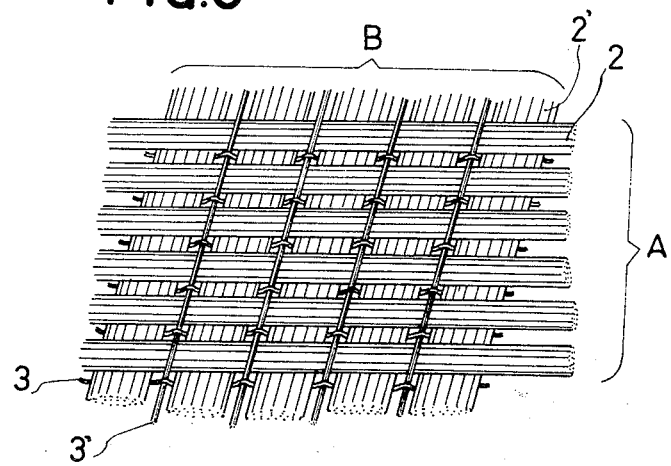
FIG. 3 is an enlarged perspective view illustrating a third embodiment of the fabric structure according to the present invention.

FIG. 3 is a view showing a further embodiment of the structure of the present invention. The structure shown in FIG. 3 is similar to the structure shown in FIG. 1 but is different from the structure shown in FIG. 1 in the point that the number of the reinforcing filaments constituting each of the reinforcing filamentary yarns 2' is two times the number of the reinforcing filaments constituting each of the reinforcing filamentary yarns 2' in the structure shown in FIG. 1, and therefore, in the structure shown in FIG. 3, the width of the reinforcing filamentary yarns 2' is increased. In the structure shown in FIG. 3., the strength in the axial direction of the reinforcing filamentary yarns 2' is increased and the directional characteristic of the strength is given the structure.

The structure shown in FIG. 3 may be prepared by winding reinforcing filamentary yarns and auxiliary filamentary yarns on different warp beams, passing them through different healds so that two reinforcing filamentary yarns alternate with one auxiliary filamentary yarn and beating reinforcing filamentary yarns and auxiliary filamentary yarns alternately one by one from the weft direction by using a rapier loom or the like.

Figure 4:
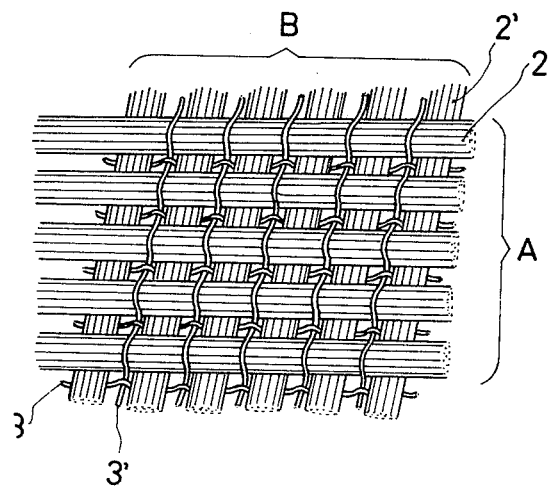
FIG. 4 is an enlarged perspective view illustrating a fourth embodiment of the fabric structure according to the present invention.

FIG. 4 is a view illustrating a still further embodiment of the structure in accordance with the present invention. The structure of FIG. 4 resembles the one shown in FIG. 1 but is different from the structure shown in FIG. 1 in the point that both the auxiliary filamentary yarns 3 and 3' are arranged in the bent state. In this structure, the tension of the auxiliary filamentary yarns as warps is equal to the tension of the auxiliary filamentary yarns as wefts. The structure shown in FIG. 4 may be prepared according to the method described hereinbefore with respect to the structure shown in FIG. 1.

Figure 5:
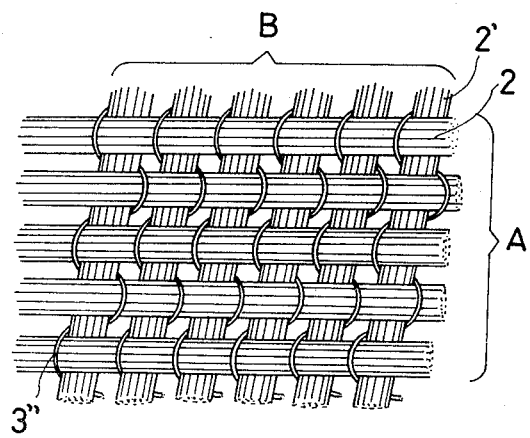
FIG. 5 is an enlarged perspective view illustrating a fifth embodiment of the fabric structure according to the present invention.

FIG. 5 is a view illustrating still another embodiment of the structure of the present invention. The structure shown in FIG. 5 is the same as the structure shown in FIG. 1 with respect to the arrangement of the reinforcing filamentary yarns 2 and 2' but is different from the structure shown in FIG. 1 with respect to the arrangement of the auxiliary filamentary yarns. More specifically, in the structure shown in FIG. 5, the auxiliary filamentary yarns 3" are not in parallel to the reinforcing filamentary yarns 2 and 2' and the auxiliary filamentary yarns 3" are bent in an S-shaped manner to alternate with the yarns 2 and 2'. Although the method for production of such structure is relatively complicated, there is attained an advantage that the reinforcing filamentary yarns can be fixed only by auxiliary filamentary yarns in one direction. The structure shown in FIG. 5 may be prepared according to the following method.

Reinforcing filamentary yarns and auxiliary filamentary yarns are wound on different warp beams, and one reinforcing filamentary yarn and one auxiliary filamentary yarn are passed through one doup heald so that they alternate with each other. The reinforcing filamentary yarn and auxiliary filamentary yarn passed through the same doup heald are introduced into one reed. Every time one weft, that is, one reinforcing filamentary yarn, is beaten, the relative position of the reinforcing filamentary yarn and auxiliary filamentary yarn as the warps are changed by a leno weaving apparatus.

Figure 6:
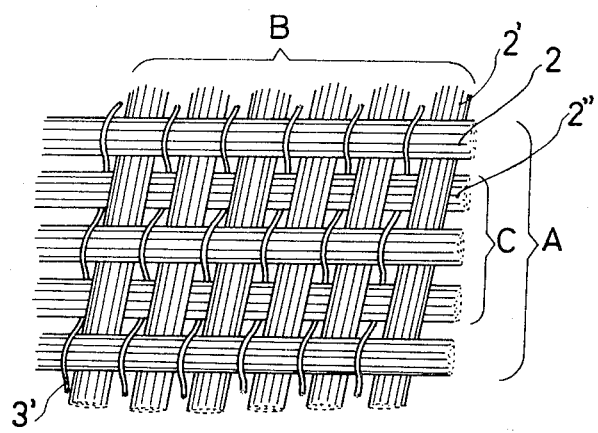
FIG. 6 is an enlarged perspective view illustrating a sixth embodiment of the fabric structure according to the present invention.

FIG. 6 is a view illustrating still another embodiment of the structure of the present invention. The structure 1 is composed of straight reinforcing filamentary yarns and auxiliary filamentary yarns as in the structure shown in FIG. 1, but in other points, the structure shown in FIG. 6 is considerably different from the structure shown in FIG. 1. In the structure 1 shown in FIG. 6, a sheet-like yarn group A composed of reinforcing filamentary yarns 2, a sheet-like yarn group B composed of reinforcing filamentary yarns 2' and a sheet-like yarn group C composed of reinforcing filamentary yarns 2" are laminated to form a 3-plies structure in which the three yarn groups cross one another alternately. Auxiliary filamentary yarns 3' are arranged in parallel to the reinforcing filamentary yarns 2' and they are bent so that they intersect the reinforcing filamentary yarns 2 and 2" alternately one after another. In this structure, there is attained an advantage that the quantity of the reinforcing fibers per unit volume is increased in FRP and therefore, the strength can be improved. The structure shown in FIG. 6 may be prepared by winding reinforcing filamentary yarns and auxiliary filamentary yarns on different warp beams, passing them through different healds so that the reinforcing filamentary yarns and auxiliary filamentary yarns are arranged alternately one by one, and beating reinforcing filamentary yarns from the weft direction.

Figure 7:
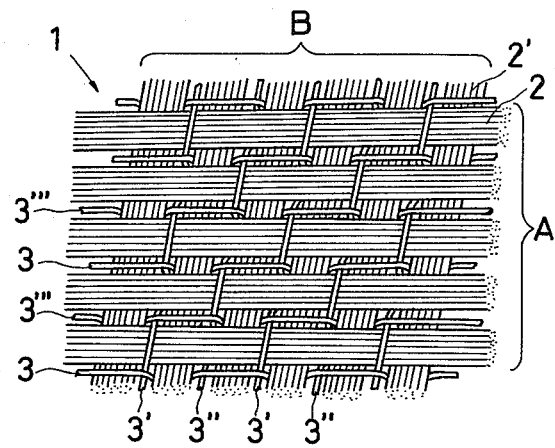
FIG. 7 is an enlarged perspective view illustrating a seventh embodiment of the fabric structure according to the present invention.

FIG. 7 shows a further embodiment of the present invention, and with the structure 1 of this embodiment, while the arrangement of reinforcing filamentary yarns 2 and 2' is identical with that in the embodiments illustrated in FIG. 1, the arrangement of auxiliary filamentary yarns is completely different from that of the structure 1 shown in FIG. 1:

As shown, the auxiliary filamentary yarn comprises yarns 3 and 3''' disposed parallel to and alternately between reinforcing filamentary yarns 2, and yarns 3' and 3" disposed parallel to and alternately between reinforcing yarns 2'.

The auxiliary filamentary yarns 3, as well as the yarns 3''', are so bent and arranged as to run above or below every second reinforcing yarn 2', that is to say, they alternate coming above and below the reinforcing yarns 2' (a pitch of 1 above and 1 below relative to reinforcing yarns 2'). It is provided, however, that the auxiliary filamentary yarns 3 and 3''' inversely run above and below reinforcing yarns 2'.

Then, auxiliary filamentary yarns 3' and 3" are bent and arranged in the same manner as yarns 3 and 3''' considered above, relative to the reinforcing filamentary yarns 2, that is to say, they alternate coming above and below the reinforcing yarns 2, and they inversely run above and below reinforcing yarns 2.

Further, the auxiliary filamentary yarns 3 (3''') and 3' (3") are arranged in a relationship such that at all points of crossing, the former (3, 3''') lie above the latter (3', 3").

Figure 8:
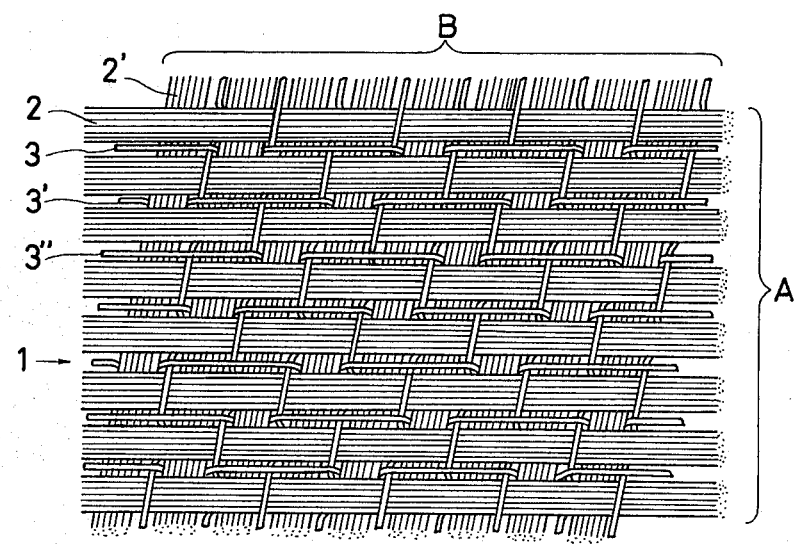
FIG. 8 is an enlarged perspective view illustrating an eighth embodiment of the fabric structure according to the present invention.

FIG. 8 shows a still further embodiment of the present invention, and the structure 1 of this embodiment as a whole resembles the structure shown in FIG. 7.

In the embodiment of FIG. 8, however, auxiliary filamentary yarns comprise yarns 3, 3' and 3", which all are disposed parallel to reinforcing filamentary yarns 2 and successively between each adjacent pair of the reinforcing yarns 2.

Each auxiliary filamentary yarn 3 is so bent and arranged as to run below a first reinforcing filamentary yarn 2' and above two immediately succeeding (or adjacent) reinforcing yarns 2' (a pitch of 2 above and 1 below relative to reinforcing yarns 2'), and the same as this applies to the remaining auxiliary filamentary yarns 3' and 3". It is provided, however, that the arrangement of auxiliary yarns 3, 3' and 3" involves a phase difference such that the yarns 3, 3' and 3" successively lie below a first one, a second one and a third one of three successively adjacent reinforcing yarns 2', respectively. Thus, when they are seen on a single reinforcing filamentary yarn 2', the auxiliary yarns 3, 3' and 3" are arranged in a pitch of 2 above and 1 below the same reinforcing yarn 2'.

Figure 9:
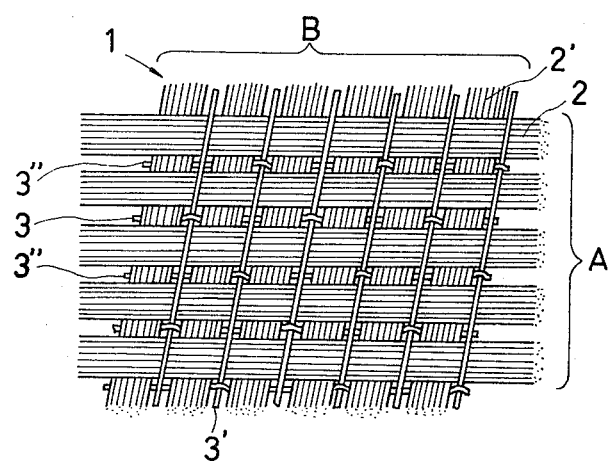
FIG. 9 is an enlarged perspective view illustrating a ninth embodiment of the fabric structure according to the present invention.

FIG. 9 shows a yet still further embodiment of the invention, the structure 1 of which again resembles the structure shown in FIG. 7, except as follows:

Of the auxiliary filamentary yarns, which in this case comprise yarns 3, 3" and 3', the yarns 3' disposed parallel to and between each adjacent pair of reinforcing filamentary yarns 2' are not bent, and the yarns 3 and 3", which are disposed parallel to and alternately between reinforcing yarns 2, are so bent and arranged as to run above or below every second auxiliary yarn 3' and inversely run above and below the yarns 3'.

Preferred applications of the structure of the present invention will now be described.

As the fibers constituting the reinforcing filamentary yarns, carbon fibers composed of multi-filament yarns are used. The multi-filament yarns are preferably composed of 1,000 to 30,000 filaments having an average monofilament diameter of 3 to 15$\mu$. The density of the reinforcing filamentary yarns in the fabric structure is preferably to be from about 1 to 10 yarns/cm.

As the fibers constituting the auxiliary filamentary yarns, there can be used, for example, glass fibers, acrylic fibers, rayon fibers, polypropylene fibers, polyamide fibers, polyaramide fibers and polyester fibers. Especially, glass fibers and polyaramide fibers are preferable as the auxiliary filamentary yarns. Multi-filament yarns composed of fibers selected from these fibers are used as the auxiliary filamentary yarns.

In case of glass fibers, filament yarns composed of 100 to 800 filaments having an average monofilament diameter of 5 to 15$\mu$ are used, and in case of polyaramide fibers such as "Kevlar-49" or "Kevlar-29" produced by du Pont, filament yarns of 134 or 267 filaments having an average monofilament diameter of 11.9$\mu$ in the former and 134 or 267 filaments having an average monofilament diameter of 12.1$\mu$ in the latter are used, respectively.

In the present invention, it is indispensable that the elongation at break of the auxiliary filamentary yarns should exceed that of the reinforcing filamentary yarns, and it is preferred that the elongation at break of the auxiliary filamentary yarns be at least two times the elongation at break of the reinforcing filamentary yarns. Accordingly, the materials of auxiliary filamentary yarns should be selected after due consideration of the above-mentioned condition of the elongation at break. Preferred combinations are described below.

The most characteristic feature of the fabric structure of the present invention is that the reinforcing filamentary yarns of carbon fibers are not bent but straightly gathered and sheet-like yarn group composed of the reinforcing filamentary yarns are not entangled with each other but laminated. Accordingly, the texture of the fabric structure of the present invention is different from the textures of known woven fabrics of reinforcing fibers. In the conventional woven fabrics, warps and wefts cross one another and reinforcing fibers are bent at these crossing points. Accordingly, the stress is concentrated on these bent portions and high strength and high modulus inherent of the reinforcing fibers cannot be sufficiently utilized. In the fabric structure of the present invention, the reinforcing fibers are straightly gathered and the foregoing characteristic properties of the reinforcing fibers can be exerted completely.

In the fabric structure of the present invention, there are present auxiliary filamentary yarns for integrally fixing yarn groups of the reinforcing filamentary yarns. The fabric structure of the present invention is characterized in that the elongation at break of the auxiliary filamentary yarns is higher than the elongation at break of the reinforcing filamentary yarns, and it is preferred that the elongation at break of the auxiliary filamentary yarns be at least two times the elongation at break of the reinforcing filamentary yarns. In the fabric structure of the present invention, since the reinforcing filamentary yarns are straightly gathered, the auxiliary filamentary yarns arranged in an extremely bent manner.

Accordingly, in a composite material including the fabric structure of the present invention, if a stress is imposed, the stress is concentrated on the bent portions of the auxiliary filamentary yarns. Therefore, the auxiliary filamentary yarns should have a high elongation at break, preferably at least two times the elongation at break of the reinforcing filamentary yarns. Also, the auxiliary filamentary yarns have preferably a shrinkage at 120° C. of not more than 2 percent. If the shrinkage of the auxiliary filamentary yarns is larger than 2 percent, the auxiliary filamentary yarns shrink on a large scale to give a bend to the straight reinforcing filamentary yarns and as a result, FRP composed of the fabric structure becomes weakened or shorted in length.

The auxiliary filamentary yarns are composed of multifilament yarns. It is preferred that the cross sectional area of the auxiliary filamentary yarns be small, especially less than ⅓ of the cross sectional area of the reinforcing filamentary yarns. If the cross sectional area of the auxiliary filamentary yarns is larger than the cross sectional area of the reinforcing filamentary yarns, the following disadvantages are caused.

(1) The proportion of the reinforcing filamentary yarns occupying a certain volume of the structure becomes small, and the characteristic properties of the reinforcing filamentary yarns cannot be sufficiently exerted.

(2) When FRP is formed by using this fibrous structure, a resin is intruded into spaces defined by convexities and concavities of the auxiliary filamentary yarns and FRP having a high fiber volume ratio cannot be obtained.

(3) The rigidity of the auxiliary filamentary yarns is increased and the reinforcing filamentary yarns are bent by such high rigidity of the auxiliary filamentary yarns.

In accordance with a preferred embodiment of the present invention, the rigidity of the auxiliary filamentary yarns is less than 1/5 of the rigidity of the reinforcing filamentary yarns. If the rigidity of the auxiliary filamentary yarns is too high, the reinforcing filamentary yarns are readily bent by the auxiliary filamentary yarns.

Two sheet-like yarn groups of the reinforcing filamentary yarns are laminated according to a most preferred embodiment, but three sheet-like yarn groups as shown in FIG. 6 or more sheet-like yarn groups may be used in the present invention.

It is preferred that the cross-sectional shape of the reinforcing filamentary yarns be flat. Namely, it is preferred for the reinforcing filamentary yarns to have a tape-like configuration. As means for expanding the width of the reinforcing filamentary yarns, there may be adopted a method in which respective filaments are arranged flatly or a method in which the number of the filaments is increased and the filaments are arranged flatly to increase the width of each filamentary yarn. It is preferable that ratio of the thickness to the width of the flat cross-sectional filamentary yarns is from about 1.15 to 1:30. For large ratio of flatness, resin is impregnated into the fabric structure more evenly whereby property of FRP becomes even. Also, a high fiber content per unit volume of FRP is easily obtained and accordingly the strength of FRP becomes high.

Yarn groups of the reinforcing filamentary yarns should be laminated so that the yarn directions of the yarn groups cross each other. It is most preferred the crossing angle be a right angle.

The so prepared structure of the present invention is impregnated with an uncured thermosetting resin to form a so-called prepreg.

As the thermosetting resin, there may be employed an unsaturated polyester resin, an epoxy resin, a polyimide resin and a phenolic resin.

The prepreg of the present invention may be formed into a fiber-reinforced plastic article by thermally setting the impregnated thermosetting resin, and the resulting fiber-reinforced plastic article can be used for aerial or spatial structural members such as an airplane wing, a helicopter rotor, an airplane body, a wing girder and a door flap of an airplane, sporting goods such as a boat, a canoe, a yacht, a fishing rod, a racket, skis, a bow, an arrow, a club, a hockey stick and a bicycle frame, and ordinary industrial articles such as an automobile body, an automobile part, a bumper, a dash board, a medicinal instrument, an X-ray cassette, a tanker stand, a tank, a loud speaker, a musical instrument, a ship, a centrifugal separation equipment and a fly wheel.

The present invention will now be described in detail by reference to the following Examples that by no means limit the scope of the invention.

EXAMPLE 1

High strength carbon filamentary yarns composed of 3,000 filaments having an average monofilament diameter of 7$\mu$ and having a strand strength of 300 Kg/mm$^2$ and a strand modulus of 23.5×10$^3$ Kg/mm$^2$ (hereinafter referred to as "TORAYCA" T300-3000 fil) were used as the reinforcing filamentary yarns and 22.5 texture count glass filamentary yarns formed by twisting glass fiber yarns composed of 200 filaments having an average monofilament diameter of 5$\mu$ at a twist number of 4.4 twists per inch (hereinafter referred to as ECD 450 ½) were used as the auxiliary filamentary yarns. By using these filamentary yarns, there was prepared a structure A as shown in FIG. 1, in which both of the densities of the carbon filamentary yarns and glass filamentary yarns were 6 yarns per cm in either the longitudinal direction or the lateral direction.

Each of conventional carbon fiber woven fabrics B and C including bent reinforcing yarns in which high strength carbon filamentary yarns composed of 1,000 filaments having an average monofilament diameter of 7$\mu$ and having a strand strength of 300 Kg/mm$^2$ and a strand modulus of 23.5×10$^3$ Kg/mm$^2$ (hereinafter referred to as "TORAYCA" T300-1000 fil) were used as the reinforcing filamentary yarns of the woven fabric B, shown in Table 1, and the so-prepared structure A of the present invention was coated with a solution formed by diluting a hardener-incorporated, preliminarily polymerized epoxy resin with methylethyl ketone, and a prepreg was prepared by stripping off methylethyl ketone. The prepreg was inserted between iron plates coated with a mold release prepared from a wax, a silicone and a polyvinyl alcohol solution. In case of the conventional carbon fiber woven fabric B, both 1-ply and 2-plies (lamination angle: 0°–0°) structures were formed, and in case of the conventional carbon fiber woven fabric C and the structure A of the present invention, a 1-ply structure was formed. For the formation of the carbon fiber-reinforced resin plate, curing was conducted at 120° C. for one hour under a pressure of 10 Kg/cm$^2$ in a hot press and after-curing was conducted at 130° C. for two hours.

The characteristic frequency of each carbon fiber-reinforced resin plate was measured and the flexural modulus was calculated from the measured value. Also the specific gravity and surface density were measured. Obtained results are shown in Table 1.

In the 2-plies product including the conventional carbon fiber woven fabric B, the elasticity modulus of 5.6×10$^3$ Kg/mm$^2$ was obtained, but in the 1-ply product including the conventional carbon fiber woven fabric B or C, the flexural modulus was as low as 3.2—3.5 Kg/mm$^2$. On the other hand, when the structure A of the present invention was employed, a carbon fiber-reinforced resin plate having such a high flexural modulus as 5.5×10$^3$ Kg/mm$^2$ was obtained.

A speaker cone was formed by using the so-prepared carbon fiber-reinforced resin plate including the structure A of the present invention. Since this resin plate had a thin 1-ply structure having a small surface density and a high flexural modulus, the molding operation could be performed very easily and a light speaker cone was obtained.

EXAMPLE 2

Epoxy resin prepregs were prepared by using the conventional carbon fiber woven fabric C shown in Example 1, a conventional unidirectional carbon fiber assembly D and the structure A of the present invention shown in Example 1. In case of the woven fabric C and the structure A of the present invention, 7 epoxy resin prepregs were laminated in the same direction (the warp axial direction), and in case of the conventional unidirectional carbon fiber assembly D, 8 epoxy resin prepregs were laminated at a crossing angle of 0°/90°.

Test pieces for the tensile test having a width of 12.7 mm, a length of 230 mm, a measurement length of 100 mm and a thickness of about 1.5 mm were cut out from the resulting cured plates so that the measurement axis was in agreement with the warp direction in case the woven fabric C and structure A and the measurement axis was in agreement with the 0° direction in case of the unidirectional carbon fiber assembly D.

Results of the measurement of physical properties of these carbon fiber-reinforced resin plates are shown in Table 2.

At the fiber volume fraction of 60%, the tensile strength of the resin plate including the conventional composite C was as low as 48 Kg/mm$^2$ because of concentration of the stress on the climp portion but the tensile strength of the resin plate including the composite A of the present invention was 82 kg/mm$^2$ close to the theoretical value calculated according to the law of mixture, which was higher than the value of 62 Kg/mm$^2$ obtained in the resin plate composed of 0°/90° laminated epoxy resin prepregs including the conventional unidirectional carbon fiber assembly D.

TABLE 1

| | Fabrics | | | A | B | C |
|---|---|---|---|---|---|---|
| Construction | Kind of Yarn | Warp | RFY | "TORAYCA" T300-3000 fil | "TORAYCA" T300-1000 fil | "TORAYCA" T300-3000 fil |
| | | | AFY | ECD450 ½ | — | — |
| | | Weft | RFY | "TORAYCA" T300-3000 fil | "TORAYCA" T300-1000 fil | "TORAYCA" T300-3000 fil |
| | | | AFY | ECD450 ½ | — | — |
| | Density (yarns/cm) | Warp | RFY | 6 | 10 | 5 |
| | | | AFY | 6 | — | — |
| | | Weft | RFY | 6 | 10 | 5 |
| | | | AFY | 6 | — | — |
| | Weight (g/m$^2$) | | | 267 | 133 | 200 |
| | Weave | | | Plain | 2/2 Twill | 2/2 Twill |
| Properties of laminates | Number of ply | | | 1 | 1  2(0°-0°) | 1 |
| | Thickness after cure (mm) | | | 0.25 | 0.11  0.21 | 0.18 |
| | Weight (g/m$^2$) | | | 342 | 169  330 | 254 |
| | Fiber content (vol. %) | | | 70 | 72  74 | 72 |
| | Specific gravity | | | 1.63 | 1.60  1.60 | 1.59 |
| | Flexural modulus (10$^3$Kg/mm$^2$) | | | 5.5 | 3.2  5.6 | 3.5 |

Note:
RFY: reinforcing filamentary yarns
AFY: auxiliary filamentary yarns

TABLE 2

| | Materials | A | C | D |
|---|---|---|---|---|
| Properties of laminates | Tensile modulus (10$^3$ Kg/mm$^2$) | 6.2 | 5.7 | 6.3 |
| | Tensile strength (Kg/mm$^2$) | 82 | 48 | 62 |
| | Fiber content (vol. %) | 60 | 60 | 60 |

What is claimed is:

1. A reinforcing fibrous structure for use in fiber reinforced plastics, which comprises (a) a yarn group A composed of a plurality of straight reinforcing filamentary yarns of carbon fibers gathered in one direction in parallel to one another in the form resembling a sheet, (b) a yarn group B composed of a plurality of straight reinforcing filamentary yarns of carbon fibers gathered in one direction in parallel to one another in the form resembling a sheet, the sheet face of the yarn group B confronting the sheet face of the yarn group A and the reinforcing filamentary yarns of the yarn group B intersecting the reinforcing filamentary yarns of the yarn group A, and (c) auxiliary filamentary yarns which hold integrally said yarn groups A and B, said auxiliary filamentary yarns having a higher elongation at break than those of the reinforcing filamentary yarns of both the yarn groups A and B wherein the shrinkage at 120° C. of the auxiliary filamentary yarns is not more than 2 percent and the cross-sectional area of the reinforcing filamentary yarns is at least 3 times the cross-sectional area of the auxiliary filamentary yarns.

2. A reinforcing fibrous structure as set forth in claim 1, wherein the elongation at break of the auxiliary filamentary yarns is at least 2 times the elongation at break of the reinforcing filamentary yarns.

3. A reinforcing fibrous structure as set forth in claim 1, wherein the rigidity of the reinforcing filamentary yarns is at least 5 times the rigidity of the auxiliary filamentary yarns.

4. A reinforcing fibrous structure for use in fiber reinforced plastics, which comprises (a) a yarn group A composed of a plurality of straight reinforcing filamentary yarns of carbon fibers gathered in one direction parallel to one another in the form resembling a sheet, (b) a yarn group B composed of a plurality of straight reinforcing filamentary yarns of carbon fibers gathered in one direction in parallel to one another in the form resembling a sheet, the sheet face of the yarn group B confronting the sheet face of the yarn group A and the reinforcing filamentary yarns of yarn group B intersecting the reinforcing filamentary yarns of yarn group A, and (c) auxiliary filamentary yarns which hold integrally said yarn groups A and B; said auxiliary filamentary yarns having an elongation at break of at least two times the elongation at break of the reinforcing filamentary yarns of both the yarn groups A and B, and shrinkage of not more than 2 percent at 120° C.; said reinforcing filamentary yarns having a rigidity of at least five times the rigidity of the auxiliary filamentary yarns and a cross-sectional area of at least three times the cross-sectional area of the auxiliary filamentary yarns.

5. A reinforcing fibrous structure, as set forth in claim 4 wherein (a) said auxiliary filamentary yarns include wefts and warps and one group of the auxiliary filamentary yarns are straightly arranged outside the yarn group A and intermediately between every two adjacent reinforcing filamentary yarns of the yarn group B in parallel to the reinforcing filamentary yarns of the yarn group B and (b) the other group of the auxiliary filamentary yarns are arranged outside the yarn group B and intermediately between every two adjacent reinforcing filamentary yarns of the yarn group A in parallel to the reinforcing filamentary yarns of the yarn group A while the other group of the auxiliary filamentary yarns are bent in such a manner that they cross the reinforcing filamentary yarns of the yarn group B and the auxiliary filamentary yarns of said one group alternately.

6. A reinforcing fibrous structure as set forth in claim 4 wherein (a) said auxiliary filamentary yarns include two groups and one group of the auxiliary filamentary yarns are arranged in a bent state outside the yarn group A and intermediately between every two adjacent reinforcing filamentary yarns of the yarn group B in parallel to the reinforcing filamentary yarns of the yarn group B, and (b) the other group of the auxiliary filamentary yarns are arranged outside the yarn group B and intermediately between every two adjacent reinforcing filamentary yarns of the yarn group A in parallel to the reinforcing filamentary yarns of the yarn group A while the other group of the auxiliary filamentary yarns are bent so that they cross the auxiliary filamentary yarns of said one group alternately.

7. A reinforcing fibrous structure as set forth in claim 4 wherein another yarn group is laminated on the yarn group A so that the sheet faces of the three yarn groups confront one another, and the reinforcing filamentary yarns of one yarn group cross the reinforcing filamentary yarns of at least one of the remaining two yarn groups alternately.

8. A reinforcing fibrous structure as set forth in claim 4, wherein the reinforcing filamentary yarns have a flat cross sectional shape.

9. A reinforcing fibrous structure as set forth in claim 4, wherein the filament number is equal in all the reinforcing filamentary yarns but the yarn width differs in the yarn groups.

10. A reinforcing fibrous structure as set forth in claim 4, wherein both the filament number and the yarn width in the reinforcing filamentary yarns differ in the yarn groups.

11. A reinforcing fibrous structure as set forth in claim 4, wherein the density of the reinforcing filamentary yarns is from 1 to 10 yarns/cm.

12. A reinforcing fibrous structure, as set forth in claim 4, wherein the auxiliary filamentary yarns are composed of at least one member selected from the group consisting of glass fibers, acrylic fibers, rayon fibers, polypropylene fibers, polyaramide fibers, polyamide fibers and polyester fibers.

13. A reinforcing fibrous structure, as set forth in claim 12, wherein the glass fibers are composed of 100 to 800 filaments having an average monofilament diameter of 5 to 15$\mu$.

14. A reinforcing fibrous structure as set forth in claim 4, wherein the reinforcing filamentary yarns of the respective yarn groups cross one another at a right angle.

15. A reinforcing fibrous structure as set forth in claim 4, wherein the reinforcing filamentary yarns and the auxiliary filamentary yarns are impregnated with an uncured thermosetting resin.

16. A reinforcing fibrous structure as set forth in claim 4, wherein the reinforcing filamentary yarns and the auxiliary filamentary yarns are impregnated with at least one uncured thermosetting resin selected from the group consisting of unsaturated polyester resins, epoxy resins, polyimide resins and phenolic resins.

17. A reinforcing fibrous structure as set forth in claim 4, 5, 6 or 7, wherein the carbon fibers are composed of 1,000 to 30,000 filaments having an average monofilament diameter of 3 to 15$\mu$.

18. A reinforcing fibrous structure as set forth in claim 17, wherein ratio of thickness to width in the flat cross-sectional shape of the reinforcing filamentary yarns is from about 1:15 to 1:30.

19. A fiber reinforced plastic including a reinforcing fibrous structure set forth in claim 5.

20. A fiber reinforced plastic including a reinforcing fibrous structure set forth in claim 18.

21. A fiber reinforced plastic including a reinforcing fibrous structure set forth in any one of claims 1-7, 8, 9 or 4.

* * * * *